No. 653,315. Patented July 10, 1900.
W. S. RICHARDSON.
FASTENER FOR GARMENTS, SUSPENDERS, &c.
(Application filed Aug. 15, 1896.)
(No Model.)

WITNESSES.
J. H. Dolan
Leo A. Walsh

INVENTOR
Wm. S. Richardson
by his attys
Clarke & Raymond

United States Patent Office.

WILLIAM S. RICHARDSON, OF BOSTON, MASSACHUSETTS, ASSIGNOR TO THE BALL AND SOCKET FASTENER COMPANY, OF SAME PLACE AND NASHUA, NEW HAMPSHIRE.

FASTENER FOR GARMENTS, SUSPENDERS, &c.

SPECIFICATION forming part of Letters Patent No. 653,315, dated July 10, 1900.

Application filed August 15, 1896. Serial No. 602,919. (No model.)

*To all whom it may concern:*

Be it known that I, WILLIAM S. RICHARDSON, a citizen of the United States, residing at Boston, in the county of Suffolk and State of Massachusetts, have invented a new and useful Improvement in Fasteners for Garments, Suspenders, and other Similar Uses, of which the following is a full, clear, and exact description, reference being had to the accompanying drawings, forming a part of this specification, in explaining its nature.

The invention relates to a fastener especially adapted for use in connection with suspenders, braces, straps, garments, &c., comprising a length of wire, one section of which is formed to provide a holder for a ball and other sections of which are formed to provide means for attaching or securing the holder to the suspenders, strap, garment, or other thing with which it may be used.

Figure 1:
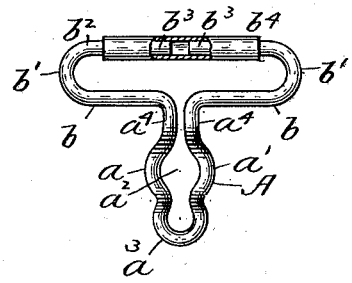
Figure 3:
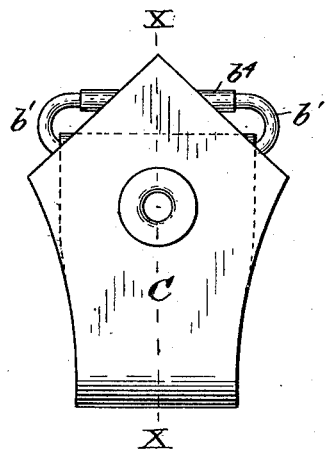
Figure 2:
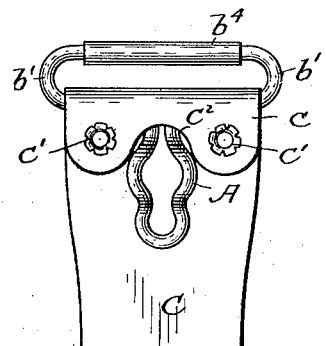
Figure 4:
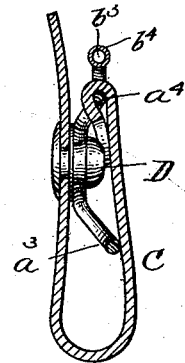

In the drawings, Figure 1 represents a view in elevation of one form of my invention. Fig. 2 shows it applied to a suspender-end. Fig. 3 represents it as engaged with the ball of the suspender-end. Fig. 4 is a vertical section upon the dotted line $x\ x$ of Fig. 3. Figs. 5, 6, 7, and 8 illustrate other forms of the invention to which reference is hereinafter made.

In practicing the invention a wire blank of suitable length is fashioned to form the curved yielding sides $a\ a'$ of a ball-holder A. These sides provide an entrance $a^2$ for the ball or other device. They are connected at one end by the loop or curved section $a^3$, and they have extending from their other end the arms or extensions $a^4$, which are of a length to be shaped or fashioned into a holding device, which may also serve as a connecting medium or as an independent fastener or attaching device or a part of an independent fastener or attaching device. In Figs. 1 to 4, inclusive, this holding device is represented in the form of a metal loop by means of which the fastener is attached to a suspender-end, and the loop acts not only to attach the fastener to said end, but also as a means for securing the tab end or section C of the suspender to said end. The loop is formed by bending outward from the sections $a^4$ of the ball-holder A the wire to form the lower bar $b$, and the wire is then bent upward to form the ends $b'$, and then inward to form the bar $b^2$, the ends $b^3$ being in line with each other and being coupled together by a sleeve $b^4$. The suspender-end (not shown) passes through the loop and is attached to itself. The upper end $c$ of the tab C is also passed through the loop and fastened to itself by rivets $c'$. The end is cut away at $c^2$ to expose the ball-holder A. The tab has the ball D, which is adapted, when in engagement with the ball-holder, to form a loop, as represented in Figs. 3 and 4, for the reception of a button-piece or cord of the suspender. (Not shown.)

The socket-entrance may be set out from the face of the tab by bending inward the end section $a^3$ of the ball-holder and the sections $a^4\ a^4$. (See Fig. 4.) The end $a^3$ thus becomes a leg for supporting the lower or outer end of the ball-holder, as well as a means for providing the sides $a\ a'$ of the socket with increased resiliency.

Figure 5:
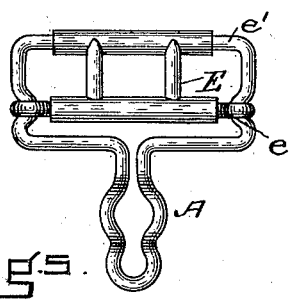

In Fig. 5 the integral extensions of the ball-holder A are shown as forming a buckle-frame which is integral with the ball-holder and which has a cross-bar $e$, carrying the jaw or prongs E of the buckle, these prongs coöperating with the cross-bar $e'$ of the buckle-frame in the usual way. The ball-holder may have its socket-entrance offset in relation to the buckle-frame, as above explained, if desired. The buckle affords means whereby the ball-holder is adjustably attached to a suspender end or strap or other device.

Figure 6:
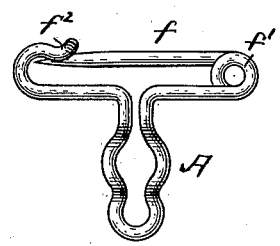

In Fig. 6 the wire ends of the ball-holder are shown as fashioned into a shape like a safety-pin, $f$ representing the pin, $f'$ its actuating-spring, and $f^2$ the retainer for holding the point of the spring. This, like the buckle, provides the ball-holder with adjustment, and also permits, as does the buckle, its easy removal from one place to another.

Figures 7, 8:
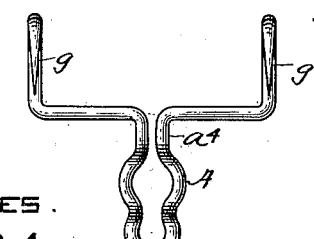

In Fig. 7 the integral wire extensions of the ball-holder are represented as turned outward from the sections $a^4$ of the ball-holder and then bent upward and curved at their upper ends downward to form hooks $g$, the ends of the wire extensions preferably being sharp.

Fig. 8 represents a modification of the structure represented in Fig. 7, in that the wire extensions continue from the sections $a^4$ in line therewith and are then curved downward and outward somewhat, so that the pointed ends are separated from each other more than they would be if they were parallel with the sections $a^4$. This form of the invention permits the adjustment of the ball-holder and its ready removal.

Having thus fully described my invention, I claim and desire to secure by Letters Patent of the United States—

1. In a fastener for suspenders, garments and other uses, a member having means such as a suspending loop, buckle, pin or hooks whereby it is adapted to be attached or secured to webbing or other material and an integral depending socket-section comprising the extensions $a^4$ integral with said suspending means arranged closely together above the socket and integral sections $a$, $a'$ opening from the said extensions $a^4$ to form a yielding socket-entrance $a^2$ and the integral connecting-sections $a^3$ connecting the lower ends of the sections $a$, $a'$, as and for the purposes described.

2. In a fastener for suspenders, garments, &c., a member having means such as a suspending loop, buckle, pin or hooks whereby it is adapted to be attached or secured to webbing or other material and a depending socket-section comprising the extensions $a^4$ integral with the frame of the attaching means brought closely together above the socket-entrance, the integral sections $a$, $a'$ opening from the extension $a^4$ to form a yielding socket-entrance $a^2$ and the lower integral section $a^3$ connecting the lower ends of the sections $a$, $a'$, the said extension $a^4$ being bent outwardly from the plane of the attaching means and the said section $a^3$ being bent inwardly from the plane of the socket-entrance, as and for the purposes set forth.

3. In a fastener for suspenders, garments, &c., a member having a rectangular buckle or loop frame, the lower bar of which is extended downwardly to provide the integral extension $a^4$ brought closely together above the socket, the integral sections $a$, $a'$ opening from the extension $a^4$ to form a yielding socket-entrance $a^2$ and the lower integral section $a^3$ connecting the lower ends of the sections $a$, $a'$.

4. In a fastener for suspenders, garments, &c., a member made of wire having a loop or buckle frame substantially rectangular in shape, the upper bar of which comprises the ends of the wire from which the member is made fastened or connected together, and the lower bar of which has an integral downward extension formed to provide a yielding socket-entrance, as and for the purposes set forth.

5. In a fastener for suspenders, garments and other uses, in combination, a tab carrying at one end a button or stud, and having at the other end means consisting of a loop or buckle for attachment to a piece of suspender-webbing or the like, said loop or buckle having integral therewith a socket extension adapted to engage said button or stud and when so engaged, to cause said tab to form a flexible holding-loop, as and for the purposes set forth.

WILLIAM S. RICHARDSON.

Witnesses:
F. F. RAYMOND, 2d,
J. M. DOLAN.